(12) United States Patent
Bhuruth et al.

(10) Patent No.: US 10,413,803 B2
(45) Date of Patent: Sep. 17, 2019

(54) METHOD, SYSTEM AND APPARATUS FOR DISPLAYING A VIDEO SEQUENCE

(71) Applicant: CANON KABUSHIKI KAISHA, Tokyo (JP)

(72) Inventors: Berty Jacques Alain Bhuruth, Bankstown (AU); Andrew Peter Downing, West Pennant Hills (AU); Belinda Margaret Yee, Balmain (AU)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 15/384,825

(22) Filed: Dec. 20, 2016

(65) Prior Publication Data

US 2018/0176502 A1    Jun. 21, 2018

(51) Int. Cl.
| | | |
|---|---|---|
| *H04N 5/77* | (2006.01) | |
| *G06T 7/50* | (2017.01) | |
| *G06T 7/70* | (2017.01) | |
| *A63B 71/06* | (2006.01) | |
| *G06T 7/20* | (2017.01) | |

(52) U.S. Cl.
CPC ............ *A63B 71/0622* (2013.01); *G06T 7/20* (2013.01); *H04N 5/77* (2013.01); *G06T 2207/30221* (2013.01)

(58) Field of Classification Search
CPC . G06T 2207/10016; G06T 2207/30221; G06T 7/50; G06T 7/70; H04N 5/77; A63B 2220/806; A63B 71/0622
See application file for complete search history.

(56) References Cited

U.S. PATENT DOCUMENTS

| | | |
|---|---|---|
| 6,683,541 B2 | 1/2004 | Staggs et al. |
| 8,742,952 B1 | 6/2014 | Bold et al. |
| 2014/0146394 A1* | 5/2014 | Tout ........................ G09B 9/307 359/630 |

OTHER PUBLICATIONS

'Sean Gustafson, Patrick Baudisch, Carl Gutwin, Pourang Irani. "Wedge: Clutter-free Visualization of Off-screen Locations" In Proceedings of the SIGCHI Conference on Human Factors in Computing Systems, Proceedings from CHI08, Florence, Italy, 2008; p. 787-796; ACM: New York, NY, USA.
Alexandra Ion, Y.-L. Betty Chang, Michael Haller, Mark Hancock, Stacey D. Scott. "Canyon: Providing Location Awareness of Multiple Moving Objects in a Detail View on Large Displays." In Proceedings of the SIGCHI Conference on Human Factors in Computing Systems, Proceedings from CHI2013, Paris, France, 2013; p. 3149-3158; ACM: New York, NY, USA.

(Continued)

*Primary Examiner* — Obafemi O Sosanya
(74) *Attorney, Agent, or Firm* — Canon U.S.A., Inc. IP Division

(57) ABSTRACT

A method of displaying a video sequence of a scene captured using a video capture device, the video sequence having a limited field of view of the scene. A plurality of objects positioned in the scene outside limits of the field of view of the captured video sequence is determined. A representation of at least one of the objects is generated, a characteristic of the generated representation being determined from an object impact measure defining, at least in part, a confidence that the at least one object will enter the field of view. The generated object representation is displayed together with, and proximate to, a display of the captured video sequence.

17 Claims, 11 Drawing Sheets

(56) References Cited

OTHER PUBLICATIONS

Eric Foote, Peter Carr, Patrick Lucey, Yaser Sheikh, and Iain Matthews. "One-man-band: A touch screen interface for producing live multi-camera sports broadcasts." In Proceedings of the 21st ACM international conference on Multimedia, pp. 163-172. ACM, 2013.

Falcon 4.0; URL:<https://en.wikipedia.org/wiki/Falcon_4.0#/media/File:Falcon-4-history.svg</a>; captured Dec. 19, 2016.

Falconpedia: Everything You Need to Know About Falcon 4.0, Steerpoint; URL:<http://falcon4.wikidot.com/concepts:steerpoint>; captured Jan. 18, 2017.

Steam: Falcon 4.0; URL:<http://store.steampowered.com/app/429530>; accessed Dec. 1998; captured Jan. 18, 2017.

* cited by examiner

METHOD, SYSTEM AND APPARATUS FOR DISPLAYING A VIDEO SEQUENCE

TECHNICAL FIELD

The present invention relates to the operation of a virtual camera in or around dynamically moving objects representing targets of camera activity. The present invention also relates to a method, system and apparatus for displaying a video sequence, and to a computer program product including a computer readable medium having recorded thereon a computer program for displaying a video sequence.

BACKGROUND

During operation of a conventional physical camera situated in or around dynamically moving objects, a camera operator will look at a view screen or through a view finder, to understand their camera framing. However, the camera operators often also need to look around the camera or rely upon their other senses to provide situational awareness of the dynamically moving objects.

There are situations such as the operation of remote cameras or cameras operating in virtual or simulated environments, where camera operators are not themselves immersed in or even present in or around the scene. As a consequence, the operator's situational awareness is limited to the view provided by the camera itself. This limited situational awareness often negatively impacts on the quality of the resultant video capture.

In a mostly static scene and without the need for camera movement, being limited to just the immediate camera view is often sufficient. However, when operating around dynamically moving objects, the operator needs to be able to predict and respond to movements of potential objects. A good example of an environment with dynamically moving object is a sports field.

On a sports field, camera operators need to be aware of players approaching from outside of their cameras field of view. For example, a player on the sports field might run immediately in front of the camera position, ruining the aesthetics of a current shot.

On a sports field, camera operators also need to be aware of the impact of their own movement around the scene without turning their camera to look, since turning their camera to look conflicts with their need to achieve good framing on the target objects. For example, the camera operators might unintentionally move a virtual camera backwards through the position of a player on the sports field, ruining the aesthetics of the current shot.

Virtual camera operation in a first-person perspective gaming environment may seem superficially similar to the above sports field example in that the game player is effectively driving a camera through a virtual environment and the camera operator certainly requires situational awareness. However, the game player is free to jerk their camera about and look around as much as the game player likes. Such movements, in fact, may be felt to be an inherent aspect of the game experience.

One method for providing virtual camera operator situational awareness has been to provide a "mini map". The mini map is a small map, centred on the camera (and/or game player) with graphical indications of the surrounding scene to show adjacent players and structures. The main limitation of the mini map method is the valuable display screen real estate that the mini map consumes. Further limitations are that the mini map can be distracting from the camera operator core function of capturing the best camera framing of events, and that mini maps provide no sense of the roving three dimensional (3d) context in which a virtual camera operator is required to perform.

Another method for providing virtual camera operator situational awareness is to overlay proximity indicators on the side of the view screen or view finder. Simple proximity information is insufficient to allow a camera operator to perform high quality shot planning, as the proximity information lacks any substantial predictive capability. A further limitation is that simple proximity indicators provide no sense of the roving 3d context in which a virtual camera virtual camera operator is required to perform.

There is a need to provide a means for overcoming limitations of the above methods, which provides situational awareness to a virtual camera operator.

SUMMARY

It is an object of the present invention to substantially overcome, or at least ameliorate, one or more disadvantages of existing arrangements.

In contrast to the game player movements described above, often a camera operator needs to maintain smooth camera movement and framing of immediate target objects in a scene, without diminishing situational awareness of the camera operator. Disclosed are arrangements in which icons displayed around the outside of a camera view screen or view finder are used to indicate objects of interest outside of a field of view. A variety of rendered characteristics may be applied to the icons to visually indicate their immediate or predictably impending significance to video framing.

The type of icon may indicate the type of object (e.g., ball, player, goal post etc.). Icon transparency may represent anticipated depth of field where the object would enter into camera view. Icon position around the screen may indicate where the object would enter a two dimensional (2d) camera image frame and an arrow attached to the icon may be used to indicate the objects orientation by arrow direction and the imminence of an objects appearance in view of the virtual camera may be represented by arrow line thickness. In one arrangement, a solid human icon near the bottom right of a display screen with a thick, long arrow pointing to the left indicates a player in a scene that is about to run rapidly across the field of view from right to left, close to the virtual camera.

In contrast to methods which provide virtual camera operator situational awareness by simply increasing a size of the field of view, disclosed are arrangements which consume less screen real-estate to display icons representing objects of interest outside of a field of view and, consequently, require less rendering resources and power. Moreover, wider fields of view would not necessarily address issues associated with situational awareness since a representation of the scene may become distorted when rendered onto a flat screen, as is typical in a television broadcaster facility, or would distract the camera operator from their dedicated task of providing good framing of the action before the camera operator.

According to one aspect of the present disclosure, there is provided a method of displaying a video sequence of a scene captured using a video capture device, said video sequence having a limited field of view of the scene, said method comprising:

determining a plurality of objects positioned in the scene outside limits of the field of view of the captured video sequence;

generating a representation of at least one of the objects, a characteristic of the generated representation being determined from an object impact measure defining, at least in part, a confidence that the at least one object will enter the field of view; and displaying the generated object representation together with, and proximate to, a display of the captured video sequence.

According to another aspect of the present disclosure, there is provided an apparatus for displaying a video sequence of a scene captured using a video capture device, said video sequence having a limited field of view of the scene, said apparatus comprising:

means for determining a plurality of objects positioned in the scene outside limits of the field of view of the captured video sequence;

means for generating a representation of at least one of the objects, a characteristic of the generated representation being determined from an object impact measure defining, at least in part, a confidence that the at least one object will enter the field of view; and means for displaying the generated object representation together with, and proximate to, a display of the captured video sequence.

According to still another aspect of the present disclosure, there is provided a system for displaying a video sequence of a scene captured using a video capture device, said video sequence having a limited field of view of the scene, said system comprising:

a memory for storing data and a computer program;

a processor coupled to the memory for executing the computer program, the computer program having instructions for:

determining a plurality of objects positioned in the scene outside limits of the field of view of the captured video sequence;

generating a representation of at least one of the objects, a characteristic of the generated representation being determined from an object impact measure defining, at least in part, a confidence that the at least one object will enter the field of view; and displaying the generated object representation together with, and proximate to, a display of the captured video sequence.

According to still another aspect of the present disclosure, there is provided a non-transitory computer readable medium having a computer program stored on the medium for displaying a video sequence of a scene captured using a video capture device, said video sequence having a limited field of view of the scene, said program comprising:

code for determining a plurality of objects positioned in the scene outside limits of the field of view of the captured video sequence;

code for generating a representation of at least one of the objects, a characteristic of the generated representation being determined from an object impact measure defining, at least in part, a confidence that the at least one object will enter the field of view; and code for displaying the generated object representation together with, and proximate to, a display of the captured video sequence.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
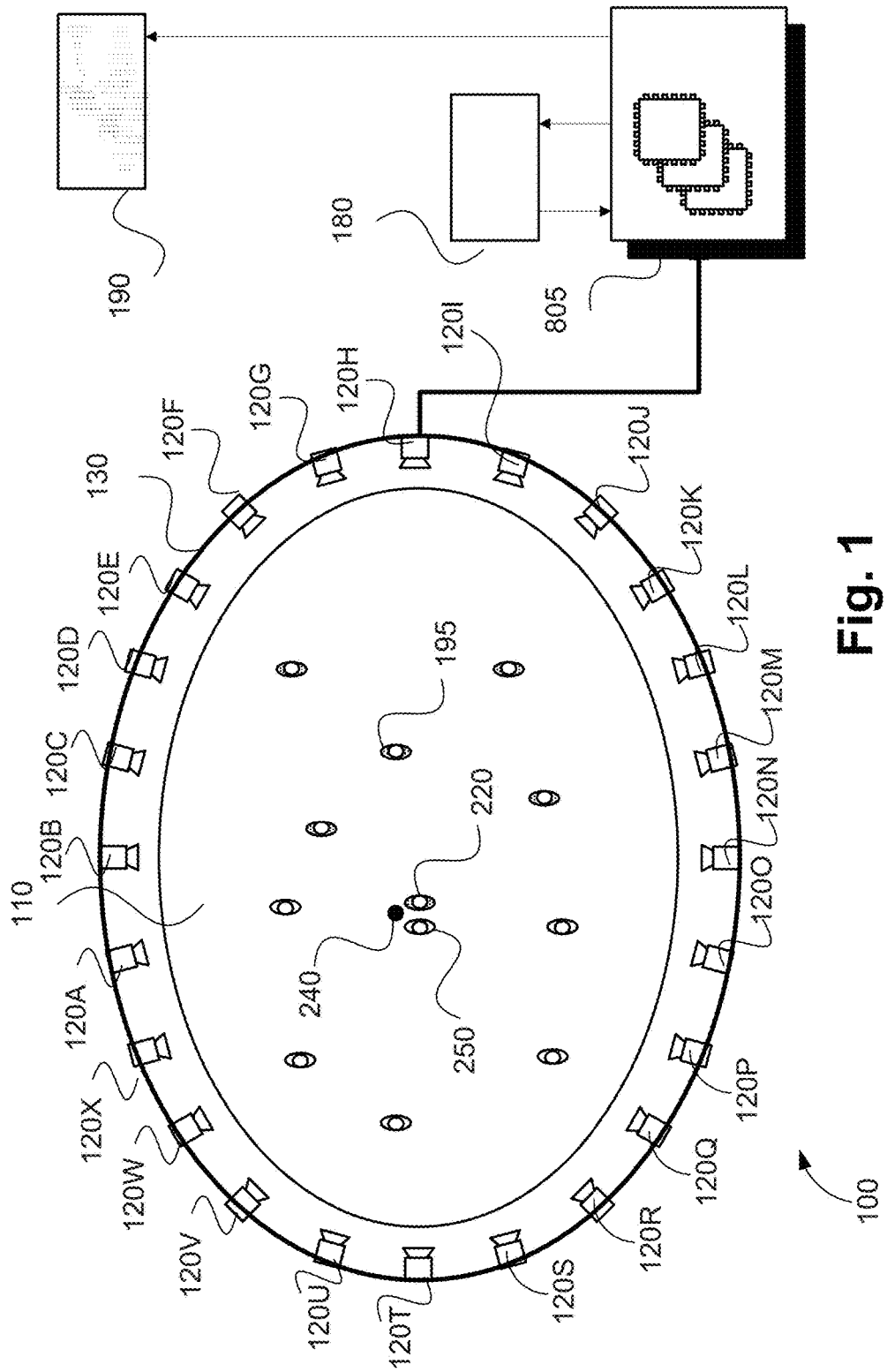
FIG. 1 is a schematic block diagram of a data processing architecture.

Where reference is made in any one or more of the accompanying drawings to steps and/or features, which have the same reference numerals, those steps and/or features have for the purposes of this description the same function(s) or operation(s), unless the contrary intention appears.

Arrangements described herein are adapted for use in the context of a sports or similar performance arena as shown for example in FIG. 1. As seen in FIG. 1, arena 110 is assumed to be centred on a playing field that is approximately rectangular, oval or circular, allowing the arena 110 to be surrounded by one or more rings of cameras 120A-120X. As seen in FIG. 1, the arena 110 includes a single ring of cameras 120A-120X. Each of the cameras 120A-120X is located at a respective predetermined location with respect to the arena 110. The arena 110, in the example of FIG. 1, contains players from a first team (e.g. 150) and a second team (e.g. 160) and a ball 140. The player 150 may be represented by a first object, the player 160 may be represented by a second object and the ball 140 by a third object.

The cameras 120A-120X of the ring of cameras shown in FIG. 1 are synchronised to capture frames at the same instants in time so that all points on the playing field defined by the arena 110 are captured simultaneously from a large number of viewpoints.

In some variations, the full ring of cameras as shown in FIG. 1 is not employed but rather some subsets of the full perimeter are employed. This latter arrangement may be advantageous when certain viewpoints are known to be unnecessary ahead of time.

Video frames captured by a camera, such as the camera 120A, are subject to processing and temporary storage near the camera 120A prior to being made available, via a network connection 130, to a processing unit 805 (see FIGS.

Figure 8A:
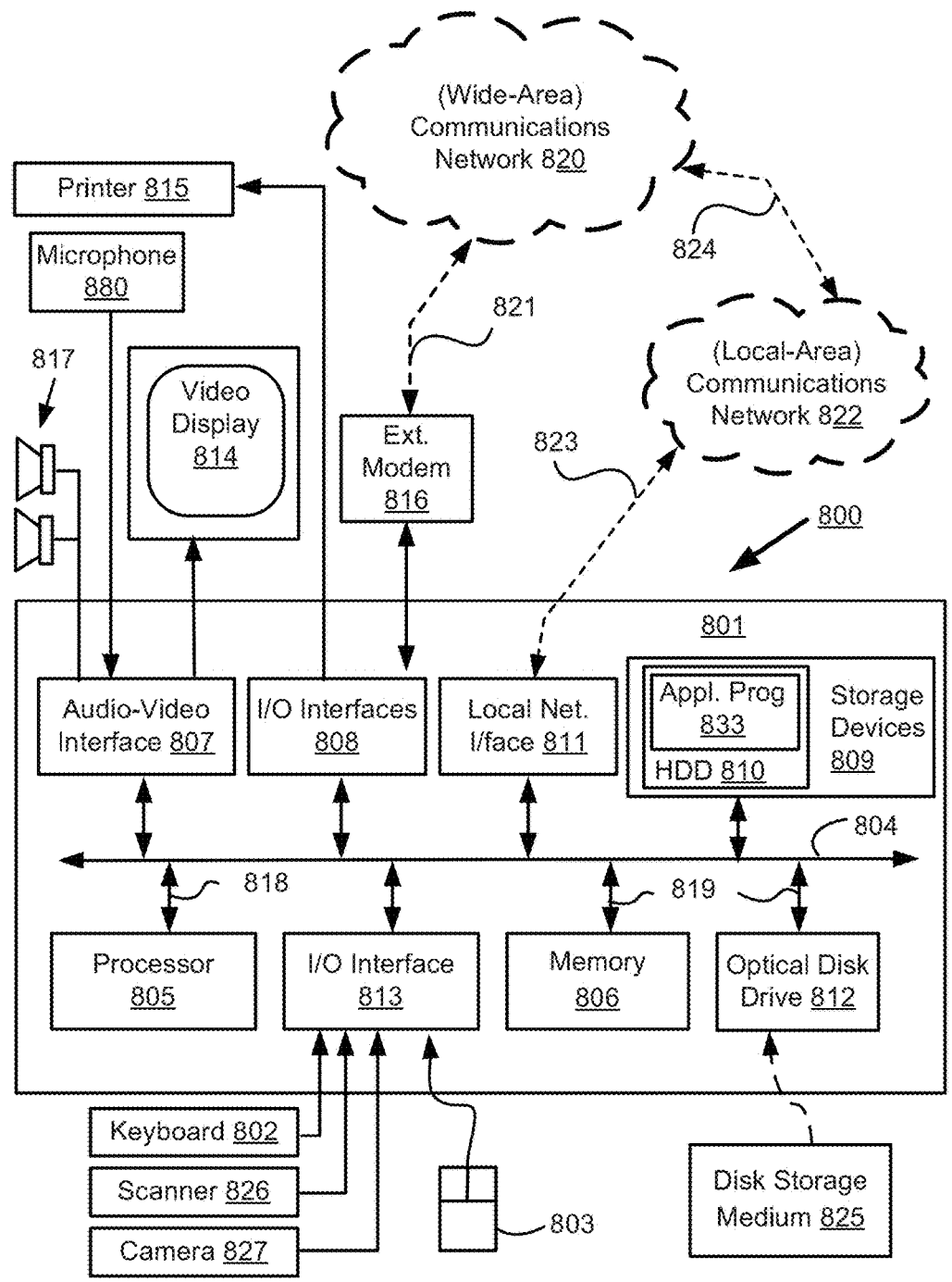
FIGS. 8A and 8B form a schematic block diagram of a general purpose computer system upon which arrangements described can be practiced.

8A and 8B) configured for performing computational video processing. As seen in FIG. 8A, the processing unit 805 is configured within a computer module 801. However, in an alternative arrangement, a separate video processing unit may be used to implement the described arrangements.

The processing unit 805 receives controlling input from a controller 180 that specifies the position, orientation, zoom and possibly other simulated camera features for a virtual camera within the arena 110. The processing unit 805 may be configured to synthesise a specified virtual camera perspective 190 based on video streams available to the processing unit 805 from the cameras 120A-120X surrounding the arena 110.

"Virtual cameras" are referred to as virtual cameras because the functionality of a virtual camera is computationally derived by methods such as interpolation between cameras or by rendering from a modelled three dimensional (3d) scene constructed using data from many physical cameras surrounding the scene, rather than simply the output of any single physical camera.

A virtual camera location input may be generated by a human virtual camera operator and be based on input from a user interface device such as a joystick, mouse 803 (see FIG. 8A) or similar controller including dedicated controllers comprising multiple input components. Alternatively, the camera position may be generated fully automatically based on analysis of game play. Hybrid control configurations are also possible whereby some aspects of the camera positioning are directed by a human operator and others by an automated algorithm. For example, coarse positioning may be performed by a human operator and fine positioning, including stabilisation and path smoothing, may be performed by an automated algorithm.

The processing unit 805 may be configured to achieve frame synthesis using any suitable image based rendering method. Image based rendering methods may be based on sampling pixel data from a set of cameras of know geometric arrangement and combining the sampled pixel data into a synthesised frame. In addition to sample based rendering of a requested frame the processing unit 805 may also be configured to perform synthesis, 3D modelling, in-painting or interpolation of regions as required covering sampling deficiencies and to create frames of high quality visual appearance. The processing unit 805 may also be configured to provide feedback in the form of the frame quality or the completeness of camera coverage for the requested viewpoint so that the device generating the camera position control signal can be aware of the practical bounds of the processing unit 805. Video streams 190 created by the processing unit 805 may subsequently be provided to a production desk (not depicted) where the video streams 190 can be edited together to form a broadcast video. Alternatively, the video streams 190 may be broadcast unedited or stored for later compilation.

Figure 8B:
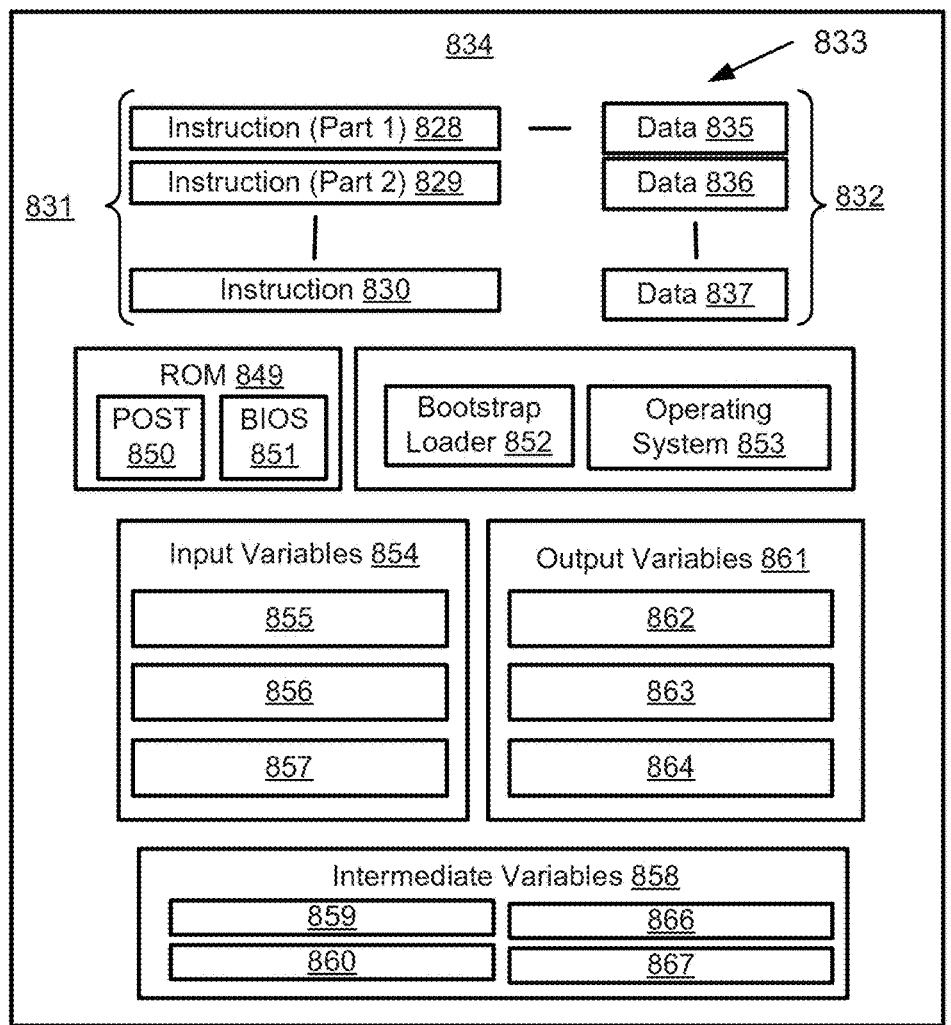
Figure 8B:
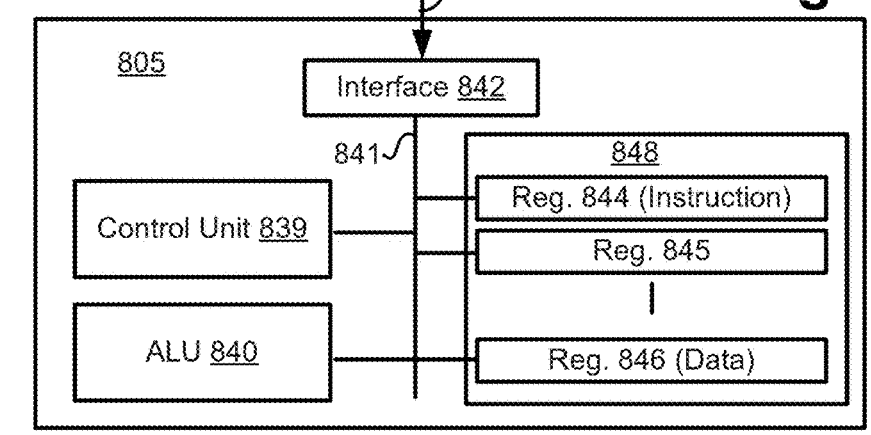

FIGS. 8A and 8B depict a general-purpose computer system 800, upon which the various arrangements described can be practiced.

As seen in FIG. 8A, the computer system 800 includes: the computer module 801; input devices such as a keyboard 802, a mouse pointer device 803, a scanner 826, a camera 120A-120X, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 801 typically includes at least the processing unit 805, and a memory unit 806. For example, the memory unit 806 may have semiconductor random access memory (RAM) and semiconductor read only memory (ROM). The computer module 801 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet circuit card, a Bluetooth® wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 800.

The components 805 to 813 and 170 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM-PC's and compatibles, Sun Sparcstations, Apple Mac™ or like computer systems.

Figure 3:
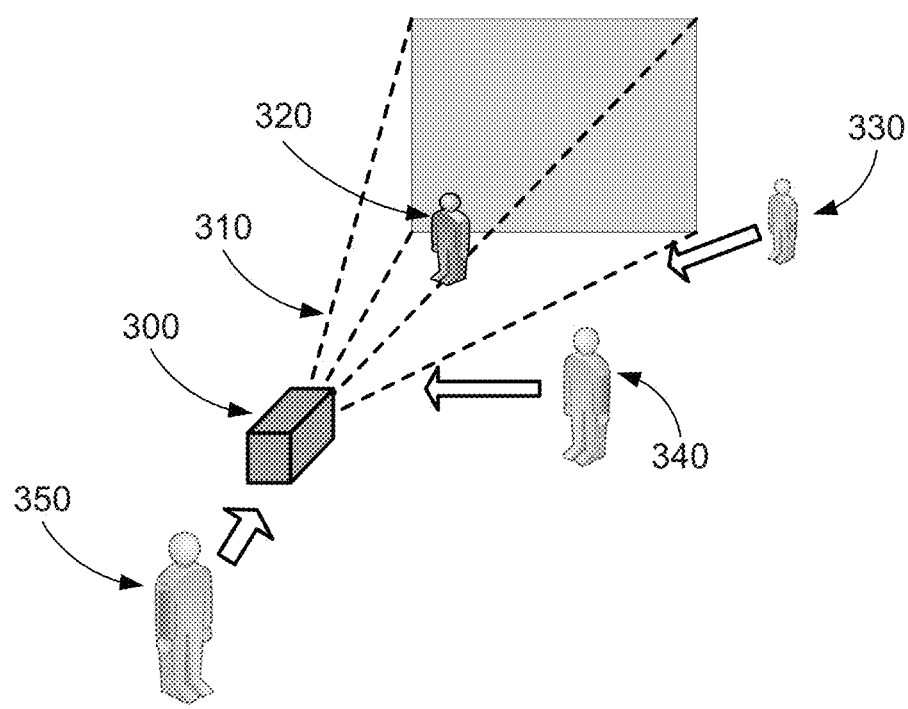
FIG. 3 is an illustrative context diagram showing a three dimensional (3d) perspective view of an example field scene showing players around a camera projected field of view.
Figure 4:
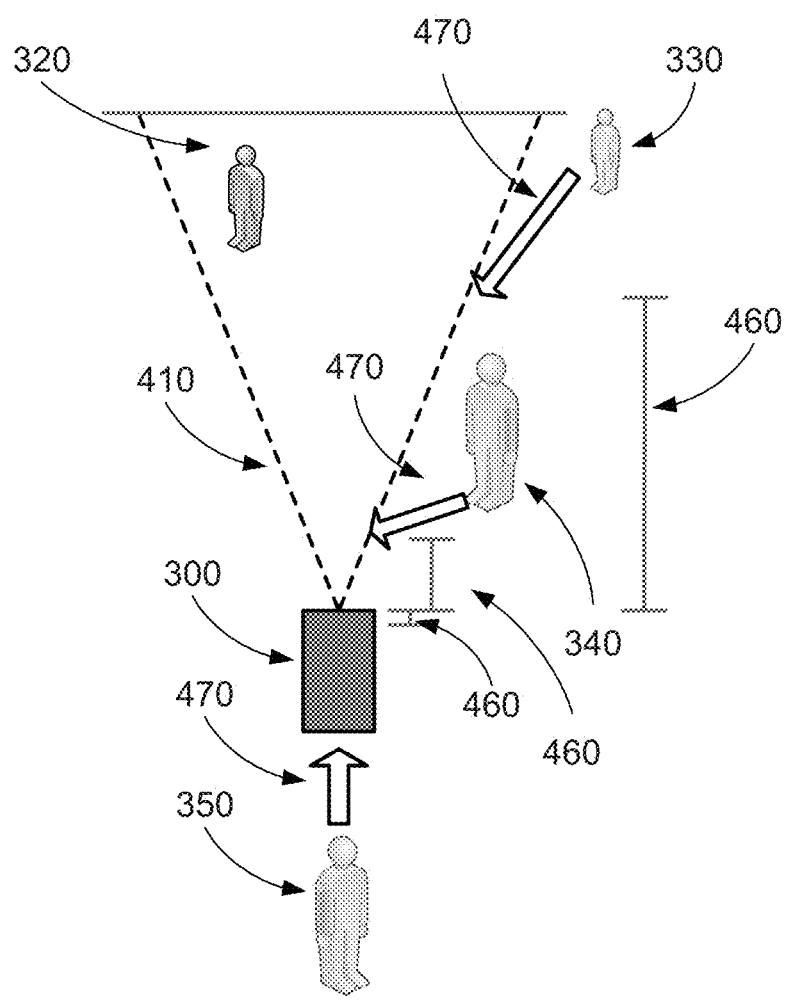
FIG. 4 is an illustrative context diagram showing a top down view of the scene of FIG. 3.
Figure 5:
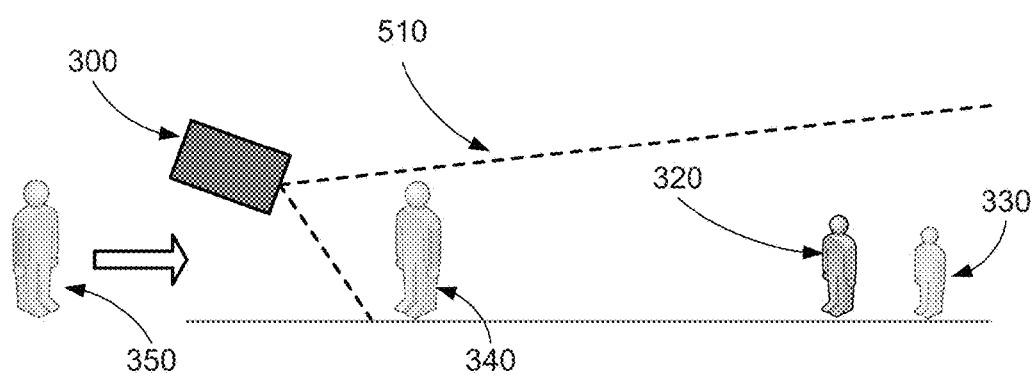
FIG. 5 is an illustrative context diagram showing a side view of the scene of FIGS. 3 and 4.

Methods described herein may be implemented using the computer system 800 wherein the processes of FIGS. 3 to 5 to be described, may be implemented as one or more software application programs 833 executable within the computer system 800. In particular, the steps of the described methods are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 833 is typically stored in the HDD 810 or the memory 806. The software is loaded into the computer system 800 from the computer readable medium, and then executed by the computer system 800. Thus, for example, the software 833 may be stored on an optically readable disk storage medium (e.g., CD-ROM) 825 that is read by the optical disk drive 812. A computer readable medium having such software or computer program recorded on the computer readable medium is a computer program product. The use of the computer program product in the computer system 800 preferably effects an advantageous apparatus for implementing the described methods.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the HDD 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 851, also typically stored in the ROM 849, for correct operation. Once the POST program 850 has run successfully, the BIOS 851 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 805 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The disclosed arrangements use input variables 854, which are stored in the memory 834 in corresponding memory locations 855, 856, 857. The disclosed arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

a fetch operation, which fetches or reads an instruction 831 from a memory location 828, 829, 830;

a decode operation in which the control unit 839 determines which instruction has been fetched; and an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 3 to 5 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The described methods may alternatively be implemented in dedicated hardware such as one or more integrated circuits performing the functions or sub functions of the described arrangements. For example, the described methods may be implemented using dedicated hardware forming a video processing unit. Such dedicated hardware may include graphic processors, digital signal processors, or one or more microprocessors and associated memories.

The extreme flexibility afforded by the arrangement of FIG. 1 described above presents a secondary set of problems not previously anticipated in sports coverage. For example, the virtual camera used to capture images of the action in the arrangement of FIG. 1 is free to move position/orientation on the field without the need for any physical object or the camera operator to be in that position. As a result, the virtual camera operator loses their sense of immersion in the scene. For example, the virtual camera operator lacks the facility to look around their camera to anticipate players entering the field of view of the virtual camera. The virtual camera operator also lacks the soundscape that the conventional camera operator would normally experience if the conventional camera operator was physically present at the location of the virtual camera.

The loss of sensory immersion by camera operators when the camera operators change from using physical cameras to virtual cameras has consequences for the ability of the camera operator to select good action framing. For example, a player on the sports field of the arena 110 might run immediately in front of the position of the virtual camera, ruining the aesthetics of a current shot. Further, a player may run right through the virtual camera, suddenly blocking the entire view of the virtual camera.

The described arrangements overcome a lack of camera operator sensory immersion, by presenting the operator of a virtual camera with continuously updated situational awareness, with a specific focus on the prediction of imminent interaction with the virtual camera field of view.

The arrangements described herein provide a means for supplementing a virtual camera operator's situational awareness around the field of view of the virtual camera being operated. The described arrangements enable the capture of well composed video coverage of events involving moving and interacting objects.

Figure 2:
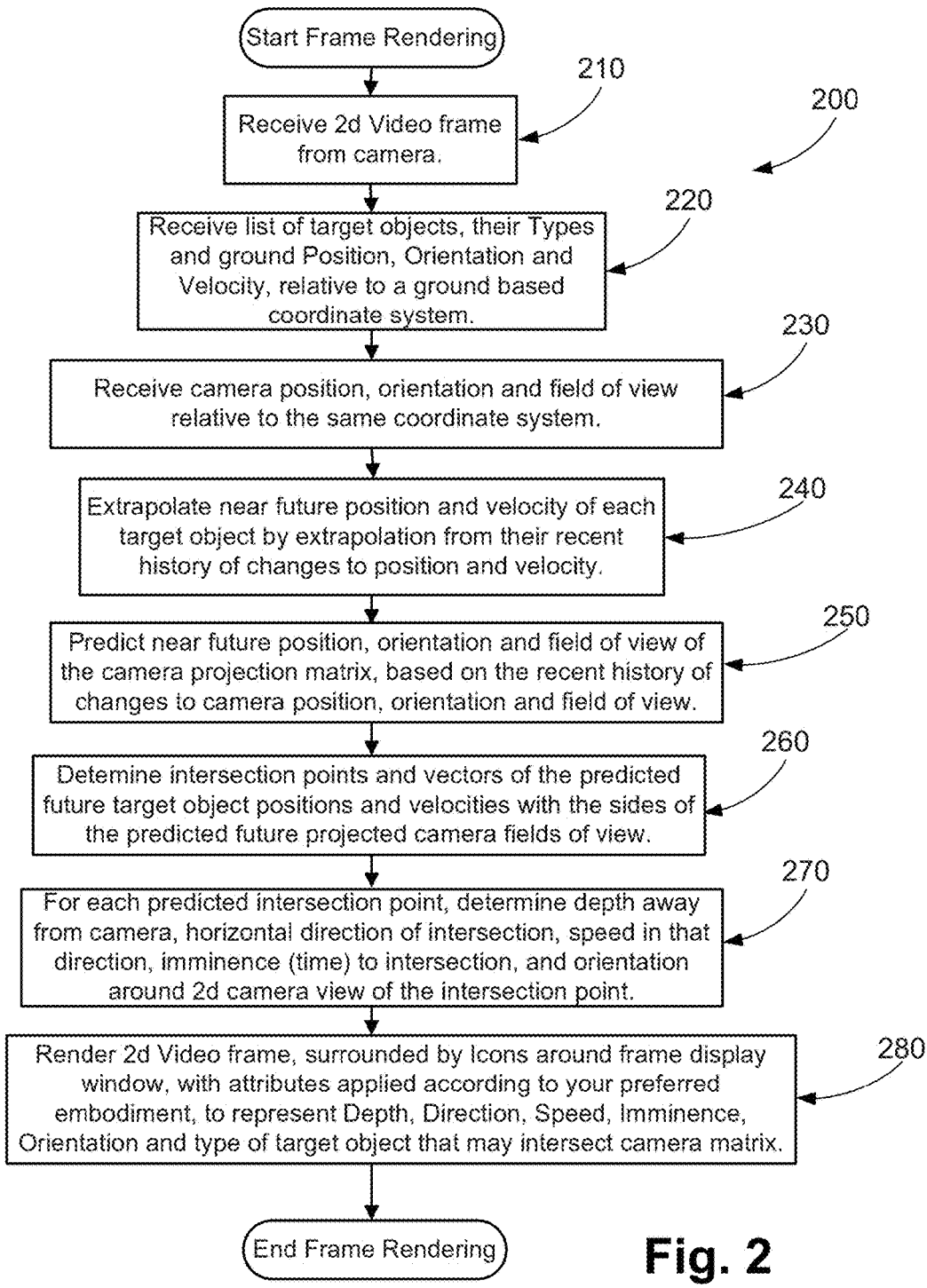
FIG. 2 is a schematic flow diagram showing a method of displaying a video image.

A method 200 of displaying an image of a scene captured using a virtual camera, will now be described with reference to FIG. 2. The method 200 may be implemented using the arrangement of FIG. 1. The method 200 may be implemented as one or more software code modules of the software application program 133 resident in the hard disk drive 110 and being controlled in its execution by the processor 105.

Prior to the process method 200 being executed, the virtual camera operator will have positioned/oriented/zoomed their virtual camera using control mechanisms. The method 200 is rapidly repeated to display a captured video sequence comprising a plurality video frames representing the scene. The method 200 is particularly advantageous where the video sequence has a limited field of view of the scene. The limited field of view of the scene is determined by the field of view of the virtual camera.

In the described arrangement, the method 200 is used to process every video image of the captured video sequence. However, in other arrangements, the method 200 may be performed less frequently depending on the reactivity required of the described arrangements.

The method 200 may be used to predict intersection of dynamically moving target objects (such as football players) with the projected field of view of the virtual camera. The method 200 may be continually refreshed to take account of such target objects (e.g., football players), that are prone to changes in velocity (i.e., speed in a direction).

The method 200 starts at receiving step 210, where a two dimensional (2d) video image (or 'video frame') is received from the virtual camera under execution of the processor 805. The video image may be stored, for example in the memory 806. The image is provided in any suitable form in which video images may be presented from ordinary physical video cameras. However, in the method 200, the video image is rendered by a computational video processing unit 805.

The method 200 continues at receiving step 220, where a list of target objects is received under execution of the processor 805. Additional information may also be received at step 220 including information about each target object, including type (e.g., player, ball etc.), ground position, orientation, velocity (i.e., speed in a direction). The additional information is received relative to a ground based coordinate system.

Target object tracking information may be known through the use of wireless tracking devices attached to clothing of players within the scene captured in the video image. In alternative arrangements, three dimensional (3D) tracking may be performed by other known methods such as stereo processing of raw video feeds from the physical cameras 120A-120X or conventional two dimensional (2D) tracking based on the view of an overhead camera.

The means by which the target object information is determined may include methods such as player/ball tracking using machine vision processing on the physical cameras 120A-120X or wireless tracking devices physically attached to players.

The method 200 continues at receiving step 230, where a position, orientation and field of view (zoom) of the virtual camera is received under execution of the processor 805.

The position, orientation and field of view (zoom) of the virtual camera is received in the same ground based coordinate system used in step 220 and may be stored, for example, in the memory 806. Virtual camera position, orientation and field of view information is available in the computational video processing unit 805, since the information is a required input for the two dimensional (2d) video image rendering. The information received at step 230 may be used for determining a plurality of the target objects positioned in the scene outside limits of the field of view of the video frame and associated video sequence.

The method 200 continues at extrapolating step 240, where the position and velocity (speed in a direction) of each of the target objects 220 is used to extrapolate the future track in three dimensional (3d) space of the target objects over time. The extrapolation performed at step 240 is a linear extrapolation from a recent history of changes to target objects position and velocity over the last N video images (i.e., last N video frames), where N is a configurable parameter that affects the sensitivity to immediate changes in target object movement. Other methods of extrapolating target object position may be applied. However, such other methods of extrapolating target object position need to include some method to control sensitivity to immediate movement of target objects. One alternative arrangement to the linear extrapolation method is to consider gait and body positioning of players, to gain advance warning of imminent changes of the anticipated movements of the players.

Step 240 will be further described with reference to FIG. 3 which is an illustrative context diagram showing a three dimensional (3d) perspective view of an example field scenario. In the example of FIG. 3, a virtual camera 300 is being used to view a scene according to a projected field of view 310. One example target object, player 320, is already in view and so may be discarded from further interest for the image being captured. Another target object, player 330, is distant, but rapidly moving diagonally into view. Another player 340 is close to the virtual camera 300 and about to move rapidly across in front of the camera 300. A final target object, player 350, is currently behind the camera 300, but moving slowly forward, such that the player 350 would soon pass through the position of the virtual camera 300.

The method 200 continues at predicting step 250, where a prediction of the future position, orientation and field of view (zoom) of the projected field of view of the virtual camera is determined under execution of the processor 805. The predicted future position, orientation and field of view (zoom) determined at step 250 may be stored, for example, within the memory 806.

Step 250 uses a linear extrapolation from a recent history of changes to virtual camera position, orientation and field of view over the last N video images (or frames), where N is a configurable parameter that affect sensitivity to immediate changes in virtual camera position, orientation and field of view. Other methods of extrapolating virtual camera position, orientation and field of view may be applied at step 250. However, such other methods of extrapolating virtual camera position, orientation and field of view need to include some method to control sensitivity of the described arrangements to immediate changes in virtual camera position, orientation and field of view. In one arrangement, for stationary cameras, the prediction in of step 250 will always be that the changes to virtual camera, position and field of view are zero.

Figure 7:
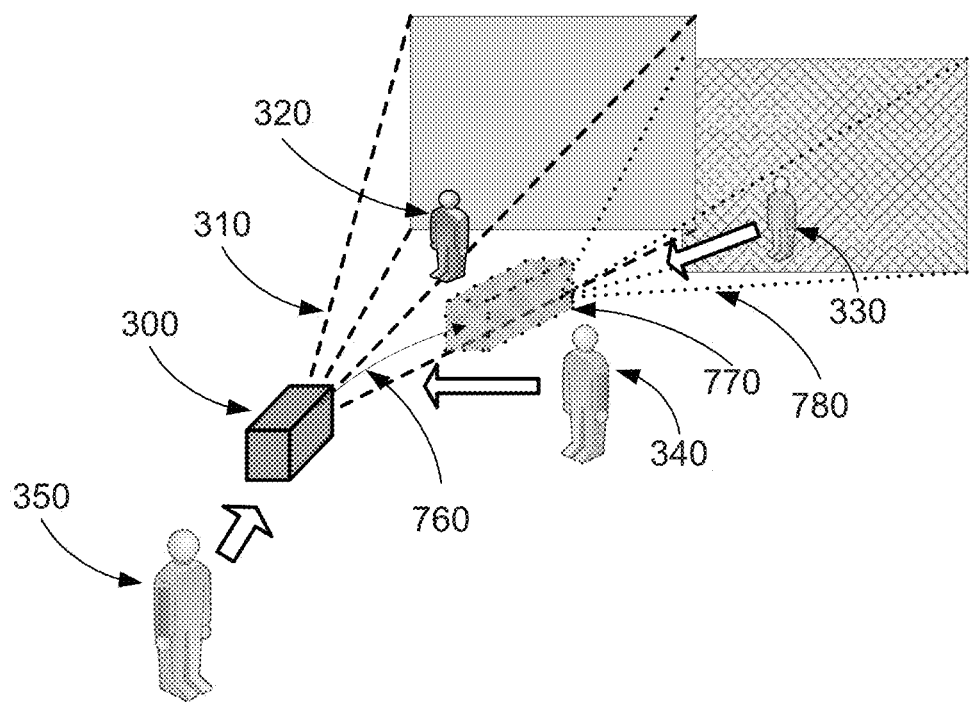
FIG. 7 is an illustrative context diagram showing a three dimensional (3d) perspective view of the same scene of FIGS. 3, 4 and 5, including a predicted future camera position, orientation and field of view.

Step 250 will be further described with reference to FIG. 7 which shows the same scene as FIG. 3, except that FIG. 7 includes a predicted future camera path. FIG. 7 shows the illustrative context diagram with three dimensional (3d) perspective view of the example field scene of FIG. 3. The virtual camera 300 is being used to view the scene according to the projected field of view 310 of FIG. 3. One example target object, the player 320 is already in view and so may be discarded from further interest for the image being captured by the virtual camera 300. Another target object, player 330, is distant, but rapidly moving diagonally towards the virtual camera 300. Player 340 is close to the virtual camera 300 and about to move rapidly across in front of the current position of the virtual camera 300. As in FIG. 3, the final target object, player 350 is currently behind the virtual camera 300, but moving slowly forward, such that the player 350 soon passes through the current camera position. Extending on the FIG. 3 scene, the virtual camera 300 is predicted to change position and orientation 760 to position shown as 770 with a projected field of view 780.

The method 200 continues at determining step 260, where an intersection of predicted target object position and velocities with the predicted virtual camera projected fields of views at N images (or frames) in the future, where N is a configurable parameter affecting the sensitivity of the described arrangements to changes in camera position, orientation and field of view as well as target object positions and velocities.

Method 200 continues at determining step 270, where the points and times of intersection of target objects with the virtual camera projected field of view predicted during step 260 are further considered. For each predicted intersection point, depth away from the virtual camera 300, horizontal direction of intersection, speed in that direction, imminence of intersection, and orientation around the two dimensional (2d) camera view of the intersection point are determined under execution of the processor 805. The depth, horizontal direction, speed, imminence and orientation may be determined as described below.

Figure 10:
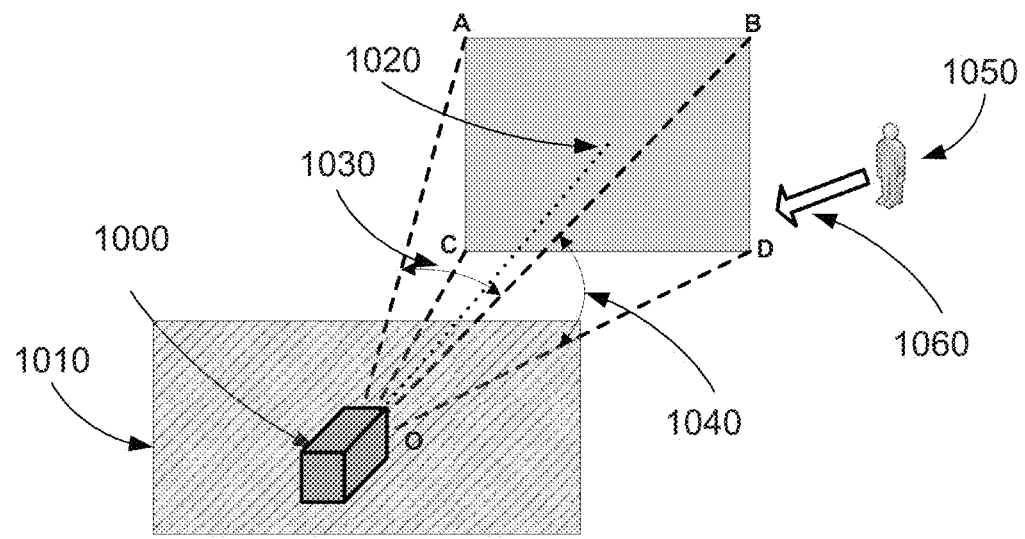
FIG. 10 is an illustrative diagram showing a three dimensional (3d) perspective view of an example field scene showing players around a camera projected field of view and a representation of the planes that define the cameras field of view.

Referring to FIG. 10, the virtual camera 1000 has a three dimensional (3d) position that may be represented as a vector and a three dimensional (3d) orientation along line 1020, that may be represented as a quaternion. Reference 1010 indicates a plane cutting through the focal point of the virtual camera and orthogonal to the camera orientation. A normal for plane 1010 may be determined by taking the virtual camera orientation quaternion and multiplying the virtual camera orientation quaternion by a unit Z vector. The virtual camera 1000 has a Field of View angle in the X dimension 1030 that sets the width of the virtual camera view and a Field of View angle in the Y dimension 1040 that sets the height of the virtual camera view.

The plane defined by points OBD in FIG. 10 cuts through the focal point of the virtual camera and aligns with the right side edge of the virtual camera field of view. A normal for plane OBD in FIG. 10 facing away from the centre line 1020 of the virtual camera view may be determined by rotating the virtual camera quaternion around the Y axis of the virtual camera quaternion by (90 degrees plus half X field of view angle) and multiplying the rotated virtual camera quaternion by a unit Z vector.

The plane defined by points OAC in FIG. 10 cuts through the focal point of the virtual camera and aligns with the left side edge of the virtual camera field of view. A normal for plane OAC in FIG. 10 facing away from the centre line 1020 of the virtual camera view may be determined by rotating the virtual camera quaternion around the Y axis of the virtual camera quaternion by (−90 degrees minus half X field of view angle) and multiplying the rotated virtual camera quaternion by a unit Z vector.

The plane defined by points OAB in FIG. 10 cuts through the focal point of the virtual camera and aligns with the top side edge of the virtual camera field of view. A normal for plane OAB in FIG. 10 facing away from the centre line 1020 of the virtual camera view may be determined by rotating the virtual camera quaternion around the X axis of the virtual camera quaternion by (−90 degrees minus half Y field of view angle) and multiplying the rotated virtual camera quaternion by a unit Z vector.

The plane defined by points OCD in FIG. 10 cuts through the focal point of the virtual camera and aligns with the bottom side edge of the virtual camera field of view. A normal for plane OCD in FIG. 10 facing away from the centre line 1020 of the virtual camera view may be computed by rotating the virtual camera quaternion around the X axis of the virtual camera quaternion by (90 degrees plus half Y field of view angle) and multiplying the rotated virtual camera quaternion by a unit Z vector.

For a potential target object 1050 moving along a vector 1060, the distance to intersection of vector 1060 with each of the planes under consideration in the set (OBD, OAC, OAB and OCD) in FIG. 10, may be determined by multiplying each planes normal vector by the target object position subtracted from the virtual camera position; and then dividing the result by the product of the target object vector 1060 and the planes normal vector. If the target object vector 1060 multiplied by the planes normal vector is zero, then the target object is moving parallel to the plane and should be eliminated from the set of planes under consideration. Otherwise, the distance to each plane intersection will be positive if intersection occurs in the direction of vector 1060. The distance to each plane intersection will be zero if the target object is on the plane. The distance to each plane intersection will be negative if intersection occurs in the reverse direction of vector 1060, in which case the plane should be eliminated from the set of planes under consideration.

Given the determined distance to intersection of vector 1060 with each of the remaining planes under consideration, the point of intersection with each plane may be determined by converting vector 1060 to a unit vector and multiplying the converted vector 1060 by the distance to intersection of each plane, ignoring cases outlined above where vector 1060 is parallel to any of the planes.

Some of the determined points of intersection of vector 1060 with the remaining planes under consideration will occur behind the virtual camera. For each of the intersection points of vector 1060 with remaining planes under consideration, the distance from plane 1010 may be determined by subtracting the intersection point position vector from the virtual camera position vector and multiplying the result by the previously determined normal for plane 1010. If the determined distance from plane 1010 of each of the intersection points of vector 1060 with each of the remaining planes under consideration is zero or negative, then that intersection point is on or behind the virtual camera field of view and the plane should be eliminated from the set of planes for further consideration.

For each of the remaining planes in the set of planes under consideration, the straight line distance from target object 1050 position to the plane is determined by subtracting the target object 1050 position vector from the camera position vector and multiplying the result by the previously determined normal for the plane. Given the previously determined distance to intersection of vector 1060 with each of these planes, the plane from the set of planes under consideration, that has the largest positive distance from target object 1050 to the plane following vector 1060, and that also has a positive determined straight line distance from target object 1050 to the plane, is selected.

In the event that there are two planes in the set of planes under consideration that have the equally largest positive distances from target object 1050 to the plane following vector 1060, and that also has a positive determined straight line distance from target object 1050 to the plane, the intersection point is on the intersection line of the two planes; and one of the two planes may be selected arbitrarily. The selection one of the two planes will now be the only remaining candidate plane where the target object would enter the virtual camera field of view. The final test is to determine if that intersection point of vector 1060 with the remaining candidate plane is on the inverse normal side of the two adjacent planes in the sense that planes OAB and OCD are adjacent to plant OBD (i.e. inside the field of view of the virtual camera). The determination of whether that intersection point of vector 1060 with the remaining candidate plane is on the inverse normal side of the two adjacent planes may be implemented for each adjacent plane by subtracting the only remaining candidate plane intersection point with vector 1060 from the virtual camera position vector and multiplying the result by the previously determined normal for that adjacent plane. If the result is negative, then the intersection point of vector 1060 with the remaining candidate plane is within the virtual camera field of view and will be known as the field of view intersection point. Otherwise, the target object 1050 on vector 1060 is removed from further consideration because the target object 1050 will not intersect the virtual camera field of view.

If the target object has been projected to intersect with the virtual camera field of view, then the point of intersection has already been determined. The detailed attributes required in step 270 may now be determined.

Depth from camera may be determined by the square root of the sum of the squares of the difference between the field of view intersection point and the virtual camera position vectors.

Direction of the target object in the virtual camera field of view is partly expressed by knowledge of the plane where the intersection was projected to occur. The direction of the target objects apparent entry into the field of view will be refined by the difference in yaw angle between the virtual camera orientation quaternion 1020 and the inverse of vector 1060 remapped as a yaw angle around the virtual camera Y axis.

Velocity of the target object was provided as an input to the process at 220. Imminence (time to intersection) can be determined by dividing the earlier computed distance from target object 1050 along vector 1060 to the field of view intersection point by the provided velocity of the target object.

Orientation and the type of the target object were already provided as inputs at step 220, and will be provided along as part of the results in step 270.

Step 270 will be further described with reference to FIG. 4, which shows a top down view of the same example field scene as in FIG. 3. The virtual camera 400 is being used to view the scene according to a projection matrix 410. As in FIG. 3, one target object, player 320 is already in view. Another target object, player 330 is distant from the virtual camera 300, but rapidly moving diagonally into the field of view of the virtual camera 300. Another target object, player 340, is close to the virtual camera and about to move rapidly across in front of the virtual camera. A final target object, player 350, is currently behind the virtual camera 300, but moving slowly forward, such that the player 350 would pass through the position of the virtual camera 300.

FIG. 4 shows one situational awareness attribute, being projected depths of field 460 (i.e., distances from virtual camera 300) where the target objects (players) are expected to enter the current view of virtual camera 300. FIG. 4 also shows, by way of representation, three other situational awareness attributes with reference to arrow 470. The situational awareness attributes include direction (i.e., represented by orientation of the arrow 470), speed (represented by length of arrow 470) and imminence (represented thickness of arrow 470). Imminence is an estimation based on speed and orientation relative to the projected field of view of the virtual camera 300.

Step 270 will be further described with reference to FIG. 5 which shows a side view of the same example field scene as in FIGS. 3 and 4. The virtual camera 300 is being used to view the scene according to a projected field of view 510. Again, one target object, player 320, is already in view. In the example of FIG. 5, other target objects, players 530, 540 and 550, are not in view yet, but the consequence of the depth at which the players 530, 540 and 550 are predicted to enter the field of view is shown by the size of the players 530, 540 and 550. The target objects, players 540 and 550, will obscure most of the view at the projected entry points of the players 540 and 550. FIG. 5 also shows the target object 350 entering from behind the camera 350 so that object 350 effectively intersects the projected field of view of the camera 350 from below.

Method 200 continues at displaying step 280, where the two dimensional (2d) video image (or frame) received at step 210, is rendered to display screen 814. The video image is displayed on the display 814 surrounded by a representation of depth, direction, speed, imminence, orientation and type for each of the target objects that were predicted to intersect with the predicted projected field of view of the camera 300 determined in step 260. In one arrangement of step 280, which will be further described by way of example with reference to FIG. 6, each target object type is rendered by generating a representation of the target object, such as an icon representing the target object. The generated representation of the target object may then be displayed on the display 814 together with, and proximate to, a display of the video image of the captured video sequence. The icon may be used to indicate the situational awareness attributes such as depth, direction, speed, imminence, orientation and type for each of the target objects.

A characteristic of the generated representation may be determined from an 'impact measure' associated with the target object, the impact measure defining, at least in part, a confidence that the target object will enter the field of view of the camera 300 determined in step 260. As an example, an impact measure may be derived from both the imminence of a target object entering the field of view and the anticipated degree of occlusion of the field of view.

Predicted target object depth may be rendered, for example, as a degree of transparency or contrast of the icon such as a person or a ball. The transparency or contrast characteristic of the icon may be modified proportionally to the projected depth of the target object entering the field of view. For example, if the target object is further away from the virtual camera, the icon would appear more opaque and/or contrast with the rest of the user interface.

Predicted target object direction may be rendered as an arrow pointing from the icon into the two dimensional (2d) video image (frame), with a direction of the arrow indicating direction of the target object. Predicted target object speed may be rendered as the length of the arrow and the imminence of a targets presence in the field of view may be rendered as the thickness of the arrow.

Target object orientation may be rendered as the icon position around the display area of the two dimensional (2d) video image.

Visual impact may also be considered as a more aesthetic concern. In this case, the virtual camera operator intent will define what visual impact means. For example, a virtual camera operator moving amongst the active players on a soccer field, striving to capture the flow of play may consider that one or more players running close across their virtual camera field of view to be a camera framing disaster, as the players occlude the core target of the camera operator's camera work (the active soccer play). In such an example, data about target objects may be aggregated to determine an impact measure and the impact measure may be compared with a predetermined threshold. If the impact measure exceeds the threshold, a large arrow may be overlaid onto the display indicating that urgent action needs to be taken to deal with the severity of this imminent visual impact upon the camera operator's intended visual narrative. The arrow is overlaid in the predicted direction of entry into the field of view.

The impact measure can be proportional to estimated size of the target object and inverse proportional to the predicted target object depth on entering field of view and imminence of target object appearance, e.g.

$$I = \frac{size}{1 + depth + imminence}.$$

Other functional relationships between size, depth and imminence are also possible. The estimated size of the target object can be determined based on target object type (ball is small, player is larger etc.) and the predicted target object depth on entering field of view. Other virtual camera operator intentions such as capturing video of a speaker walking up to stand at a podium may require a different interpretation of visual impact. In this case, the target object moving into the field of view and occluding all else, is the speaker arriving at the podium.

In addition to size, depth and imminence, the 'impact measure' can also be determined as a proportion of a screen the target object entering the field of view of the virtual camera would occupy. The proportion of the screen is calculated as a ratio of the estimated size of the target object to a display screen size.

Alternatively, the impact measure can be determined as a ratio of the expected size of the target object when entering the field of view to a size of one or more of the objects already in the field of view. The size of the objects already in the field of view can be estimated from their respective types. Additionally, if it was detected that the camera operator is tracking an object in the field of view of the virtual camera, the impact measure can be calculated as an expected occlusion caused by the target object. If it is determined that the visual impact measure exceeds a predetermined threshold, the characteristic of the generated representation can be modified accordingly, for example, by increasing contrast, opaqueness, changing colour and or thickness of arrows.

Figure 6:
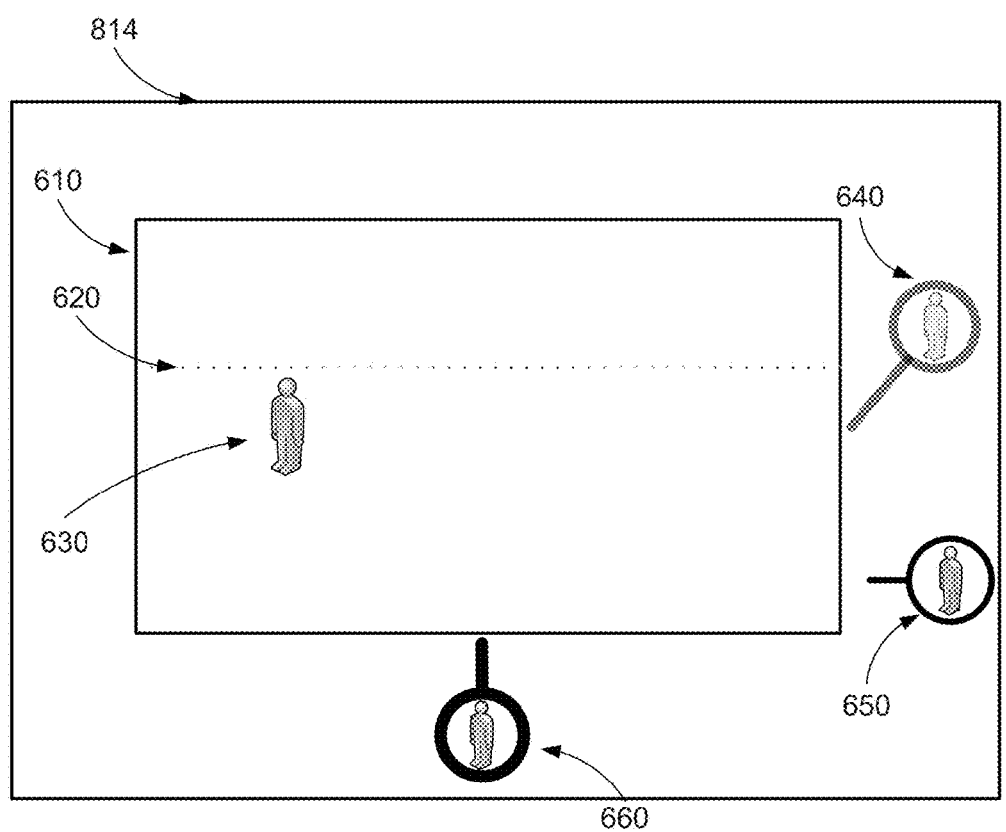
FIG. 6 is an illustrative diagram showing a display view of the scene of FIGS. 3, 4 and 5 that may be shown to a camera operator.

FIG. 6 shows a display view of the same example field scene as in FIGS. 3, 4 and 5, that may be shown to a camera operator, according to one arrangement. In the example of FIG. 6, display screen 814 is used to show a view 610 of the scene exactly as seen by the virtual camera 300 according to a projected current field of view of the camera 300. Line 620 in FIG. 6 represents the horizon. Player 630 is already in camera view 610 as seen in FIG. 6. Players 640, 650 and 660 are projected to enter camera view 610. As seen in FIG. 6, the generated representations of the players 640, 650 and 660 are displayed on the display 814 together with, and proximate to, a display of the scene.

FIG. 6 shows another two situational awareness attributes, being orientation and type of objects. In the example of FIG. 6, the icons (e.g., 630) indicate the objects are all players. However, other arrangements may use different icons to differentiate categories of objects, such as members of different teams, umpires, coaches, or any other usefully identifiable classification of target objects. The situational awareness attributes described are also presented in FIG. 6. Transparency of player 640 indicates that the player 640 will enter the field of view more distantly than player 650. The circle/line indicators 640, 650 and 660 around the icons indicate direction of the approaching player as represented by line angle. For example, indicator 660 represents that the player associated with the indicator 660 is approaching the view 610 in a vertical direction. The length of the lines in the indicators represent speed of the players. For example, in FIG. 6, the player associated with the indicator 640 is moving faster than the player associated with the indicator 650 as the line of the indicator 640 is longer than the line of the indicator 650. Imminence of the approaching players movement into the field of view is represented by line thickness. For example, in FIG. 6, the player associated with the indicator 640 is moving faster than the player associated with the indicator 650 as the line of the indicator 640 is longer than the line of the indicator 650.

Figure 9:
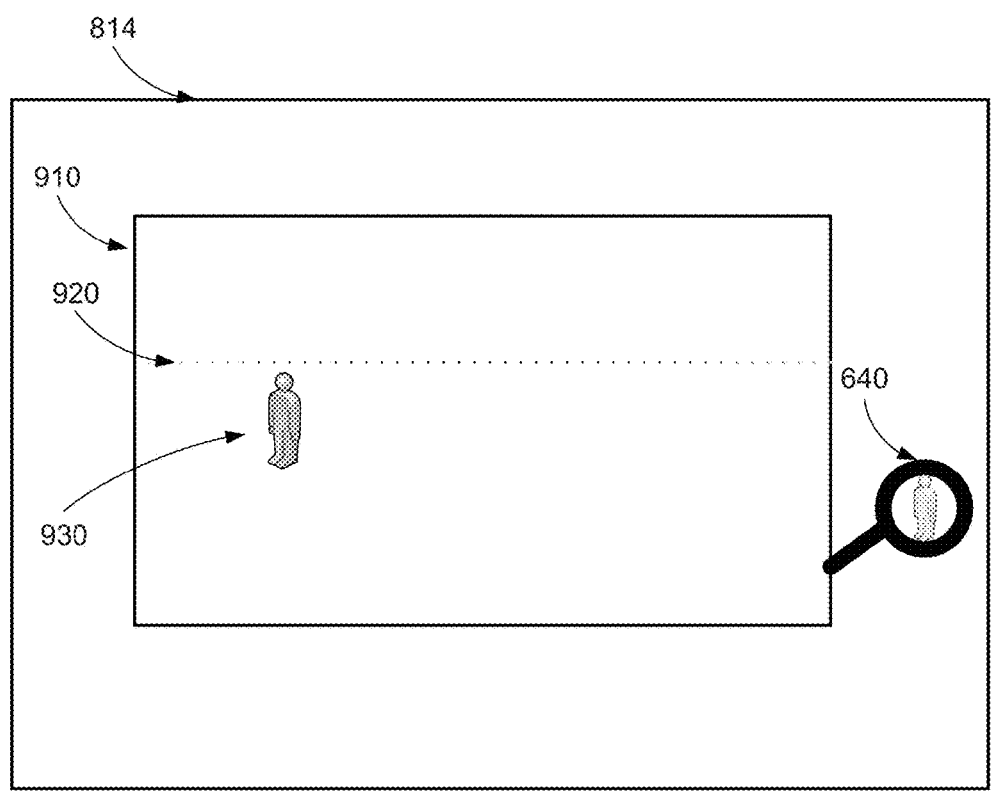
FIG. 9 is an illustrative diagram showing a display view of the scene as shown in FIG. 6, incorporating the effect of predicted future camera position, orientation and field of view.

Step 280 will be further described with reference to FIG. 9. Similar to FIG. 6, FIG. 9 shows a display view of the same example field scene as in FIGS. 3, 4 and 5, that may be shown to an operator of the virtual camera 300, according to one arrangement. As seen in FIG. 9, display screen 814 is used to show a view 910 of the scene exactly as seen by the virtual camera 300 according to a current projected field of view. In FIG. 9, line 920 represents the horizon. Player 930 is already in camera view 910. However, FIG. 9 as distinct from the example of FIG. 6, shows the effect of predicted changes to position, orientation and field of view of the virtual camera 300. Players associated with indicators 650 and 660 from FIG. 6 are no longer predicted to enter camera view 9. FIG. 9 instead shows a prediction that player associated with indicator 640 will come strongly into view as a result of motion of the camera 300.

The method 200 concludes following step 280. However, as described above, steps 210 to 280 of the method 200 then repeat for every image (or frame) from the virtual camera 300 until the camera 300 ceases operation, or at other intervals depending on the specific arrangement.

In one arrangement, the characteristics of the virtual camera 300 may be used to determine the imminence and therefore relative importance of objects with reference to a current projected field of view. For example, with reference to FIG. 3, when the camera 300 is tracking alongside a player, such as the player 320, the objects to the left and right (e.g., 330, 340) may be considered to be more important than objects moving into the field of view from above of the field of view or coming from behind the camera 300 such as the player 350.

In another arrangement, the indicators (e.g., 640, 650 and 660) may be configured not only to indicate imminence as relative importance of impacting objects on the field of view. Options for changing field of view (moving/zooming etc.) may be prioritised based on limitations to camera movement and cinematic conventions. The indicator may then suggest actions the camera 300 may take to avoid upcoming problems caused by objects moving into field of view of the camera 300.

In one arrangement, the arrangements described above may be configured to perform choreographed camera manoeuvres. For example, the virtual camera 300 may be configured to track an actor in the theatre or a dancer in the ballet. Arrangements described above may be configured to determine relative impact of external objects on the field of view of the camera 300. However, an arrangement configured to perform choreographed camera manoeuvres may determine how the camera 300 is 'going off course' and how the camera 300 going off course effects the view of the scene captured by the camera 300. The impact of going off course may be expressed on the display 814 in one or more indicators (e.g., arrows) associated with the camera 300 and may be used to determine imminence of other objects appearance in the field of view and best camera path to a target camera field of view.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. An image processing apparatus comprising:
at least one hardware processor; and
a memory which stores instructions executable by the at least one hardware processor to cause the image processing apparatus to perform at least:
obtaining a virtual viewpoint image according to a virtual viewpoint that is determined based on a user operation,
acquiring object information indicating at least a three dimensional position of an object outside a field of view corresponding to the virtual viewpoint,
generating a representation image of the object to be displayed with the obtained virtual viewpoint image, wherein a display position of the generated representation image depends on the three dimensional position of the object indicated by the acquired object information, and wherein a display characteristic of the generated representation image depends on a depth of the three dimensional position of the object from the virtual viewpoint, and
displaying the generated representation image together with the obtained virtual viewpoint image on a display screen.

2. The image processing apparatus according to claim 1, wherein the virtual viewpoint is determined based on the user operation as a viewpoint of a virtual camera.

3. The image processing apparatus according to claim 1, wherein a display characteristic of the generated representation image depends on an expected amount of time until the object enters the field of view.

4. The image processing apparatus according to claim 1, wherein a display characteristic of the generated representation image depends on imminence of the object entering the field of view.

5. The image processing apparatus according to claim 1, wherein a display characteristic of the generated representation image depends on potential visual impact of the target object entering the field of view.

6. The image processing apparatus according to claim 1, wherein the display characteristic of the generated representation image depends on the depth of the three dimensional position of the object from the virtual viewpoint in a direction of a center of the field of view corresponding to the virtual viewpoint.

7. The image processing apparatus according to claim 1, wherein the representation image indicates speed of the object.

8. The image processing apparatus according to claim 1, wherein the representation image indicates the imminence of the object entering the field of view.

9. The image processing apparatus according to claim 1, wherein the representation image indicates orientation of the object.

10. The image processing apparatus according to claim 1, wherein the representation image indicates a type of the object.

11. An image processing method comprising:
obtaining a virtual viewpoint image according to a virtual viewpoint that is determined based on a user operation;
acquiring object information indicating at least a three dimensional position of an object outside a field of view corresponding to the virtual viewpoint;
generating a representation image of the object to be displayed with the obtained virtual viewpoint image, wherein a display position of the generated representation image depends on the three dimensional position of the object indicated by the acquired object information, and wherein a display characteristic of the generated representation image depends on a depth of the three dimensional position of the object from the virtual viewpoint; and
displaying the generated representation image together with the obtained virtual viewpoint image on a display screen.

12. A system comprising:
a memory for storing data and a computer program; and
a processor coupled to the memory for executing the computer program, the computer program having instructions for:
obtaining a virtual viewpoint image according to a virtual viewpoint that is determined based on a user operation,
acquiring object information indicating at least a three dimensional position of an object outside a field of view corresponding to the virtual viewpoint,
generating a representation image of the object to be displayed with the obtained virtual viewpoint image, wherein a display position of the generated representation image depends on the three dimensional position of the object indicated by the acquired object information, and wherein a display characteristic of the generated representation image depends on a depth of the three dimensional position of the object from the virtual viewpoint, and
displaying the generated representation image together with the obtained virtual viewpoint image on a display screen.

13. A non-transitory computer readable medium having a computer program stored on the medium for causing a computer to perform an image processing method, the image processing method comprising:
obtaining a virtual viewpoint image according to a virtual viewpoint that is determined based on a user operation;
acquiring object information indicating at least a three dimensional position of an object outside a field of view corresponding to the virtual viewpoint;
generating a representation image of the object to be displayed with the obtained virtual viewpoint image, wherein a display position of the generated representation image depends on the three dimensional position of the object indicated by the acquired object information, and wherein a display characteristic of the generated representation image depends on a depth of the three dimensional position of the object from the virtual viewpoint; and
displaying the generated representation image together with the obtained virtual viewpoint image on a display screen.

14. The image processing apparatus according to claim 1, wherein executing the instructions further cause the image processing apparatus to perform receiving a plurality of images captured from a plurality of directions by a plurality of cameras, and
wherein obtaining the virtual viewpoint image includes generating the virtual viewpoint image based on the plurality of received images.

15. The image processing apparatus according to claim 1, wherein the acquired object information further indicates at least one of a type, orientation, and velocity of the object.

16. The image processing apparatus according to claim 1, wherein the representation image is displayed around the obtained virtual viewpoint image.

17. The image processing apparatus according to claim 1, wherein the display characteristic of the generated representation image depending on the depth of the three dimensional position of the object includes at least one of the following: contrast, opaqueness, colour, and thickness of the representation image.

* * * * *